United States Patent [19]

Egan et al.

[11] 4,043,742
[45] Aug. 23, 1977

[54] AUTOMATIC BURNER MONITOR AND CONTROL FOR FURNACES

[75] Inventors: Dale W. Egan, Covina; Lyman F. Gilbert, Arcadia; Harry C. Lord, West Covina; Alan E. Opel, Monrovia; Geoffrey B. Holstrom, Claremont, all of Calif.

[73] Assignee: Environmental Data Corporation, Monrovia, Calif.

[21] Appl. No.: 687,227

[22] Filed: May 17, 1976

[51] Int. Cl.² .............................................. F23N 5/08
[52] U.S. Cl. ..................................... 431/12; 250/339; 431/79; 431/90
[58] Field of Search ................. 431/12, 79, 90; 137/6; 250/339

[56] References Cited

U.S. PATENT DOCUMENTS

| | | | |
|---|---|---|---|
| 3,282,322 | 11/1966 | Steghart et al. | 431/12 |
| 3,292,855 | 12/1966 | Wright | 431/12 X |
| 3,304,989 | 2/1967 | Alexander et al. | 431/79 X |
| 3,894,834 | 7/1975 | Estes | 431/12 X |
| 3,988,104 | 10/1976 | Barber | 431/12 |

*Primary Examiner*—Edward G. Favors
*Attorney, Agent, or Firm*—D. Gordon Angus; Donald D. Mon

[57] ABSTRACT

A furnace containing a burner, supplied by fuel to be ignited at the burner, in the presence of air, is provided with a viewing duct for viewing the flame and means for detecting the radiation intensity at a plurality of different wavelengths of the radiation spectrum. The output from the detector is amplified and integrated and a signal representing the ratio of intensities at the selected wavelengths is applied to an indicator to indicate fuel-air ratio and also is applied to control means for the fuel flow or the air flow, or both, to control the fuel-air ratio at the burner and to maintain it substantially constant at a desired value. This can be done at more than one burner, providing balanced furnace operation. With this balanced furnace, there is improved firing efficiency, resulting in fuel saving and lowered pollution emissions. A computer type master controller can be used to correlate the fuel-air ratios for the individual burners.

31 Claims, 11 Drawing Figures

AUTOMATIC BURNER MONITOR AND CONTROL FOR FURNACES

This invention relates to furnaces in which fuel is burned in the presence of air at one or more burners, and more particularly to the monitoring and control of the fuel-air ratio at the burner.

Furnaces in which heat is created by flame at burners, are well-known. They commonly comprise burners supplied by a fuel such as oil, gas, pulverized coal or other material, supplied to the burner where they are ignited and burned by the oxygen in the air, producing a flame. A stack is ordinarily provided through which the combustion products are exhausted to the atmosphere. Such burners are used for supplying heat to boilers associated with the furnace and for other purposes. There are commonly provided valves or the like for controlling the total rate of fuel flow to the burners collectively and with means for controlling the total rate of air flow to the burners.

It is known that the quality and efficiency of the flame are dependent on the fuel-air ratio and accordingly attempts have heretofore been made to monitor the fuel and air flow rates to calculate the fuel-air ratio. Readings have not heretofore been made quickly. Another proposal has been to meter the air and fuel sent to each burner. This has not been a satisfactory expedient because it is not a direct measurement of the desired result, namely flame quality, and because of the mechanical complexity required for the measurement.

It is well-known that a flame produces radiation at wavelengths in the visible, ultra-violet and infrared range. It is also well-known that atoms and molecules at a flame emit radiation at specific wave lengths due to quantum and thermal exicitation and may also absorb radiation at specific wave lengths in instances where lower tempertures exist. Emission produces a peak of radiation intensity greater than that of the general background radiation adjacent the emission wave length. Absorption produces an inverse peak of radiation intensity less than that of the general background radiation adjacent the absorption wave length. In the case of emission the specific wave lengths at which radiation is emitted are called emission wave lengths, and specific wave lengths at which radiation is absorbed are called absorption wave lengths. All wave lengths other than emission and absorption wave lengths in the general wave length range are called "continuum" wave lengths. Each molecular composition of matter at some particular exitation in a flame has its own identifiable signature of emission wave length or wave lengths, and by directing radiation including emission wave lengths upon a wave length selecting device, emission lines can be displayed and the pattern of such lines constitutes the spectroscopic signature of the particular composition. In a similar manner, in the case of absorption, absorption lines can be displayed, the pattern of which constitutes the spectroscopic signature of the composition.

For any fuel burned in air there is an optimum ratio of fuel to air which is the stoichiometric ratio. For example, in the case of hydrocarbon fuel, the ratio of fuel to air should be that at which all of that fuel is burned to carbon dioxide and water with no excess air remaining. When the air supplied to the burning fuel is less than the optimum amount, some of the fuel is left unburned with consequent waste of fuel, and when the air is greater than the optimum amount there is a loss of heat due to the heating of excess air.

The spectral quality of a flame changes with changes of fuel-air ratio. Hence a departure from the optimum fuel-air ratio produces a change of the radiation intensity vs. wave length characteristic. In particular, a deviation from the optimum fuel-air ratio changes the ratio of the radiation intensity selected at two or more sets of somewhat separated wave lengths when at least one of the selected wave lengths is at or near an emission peak. For example, one of the selected wave lengths may be that of an emission peak and the other may be that at a nearby continuum or other radiation peak.

Fuel-air ratios tend to change from time to time even though fuel and air controls may initially have been set properly for optimum fuel-air ratio. Reasons for this lie in such factors as load changes, clogging of burners or fuel lines, and the changing of burners under preventive maintenance routines.

Where a furnace contains a plurality of burners, which is the usual case, the same, or desired, fuel-air ratio has heretofore often not been maintained at all the individual burners; and this has been true even if the total fuel-air ratio of all the burners collectively is maintained at a desired value. Hence operation has heretofore been at less than the best efficiency. Inefficient operation not only wastes fuel, but also results in an undesirably large amount of pollutants being expelled from the stack. Generally, the desired fuel-air ratio at each burner is that which is stoichiometric. But there are also circumstances where other than the stoichiometric condition at some or all of the burners is desired. For example there are times when it is desired that the fuel-air mixture be "fuel rich" and there are times when it is desired that the fuel-air mixture be "fuel-lean". Also there can be occasions when it is desired that one or more burners in the furnace shall receive a leaner fuel-air mixture than another or others.

An object of the present invention is to monitor the combustion process continuously so that an indication related to the fuel-air ratio of an individual burner can be produced in a matter of a second or seconds.

Another object is to control the fuel-air ratio at an individual burner in response to changes of flame spectral quality.

A related object is to maintain a desired individual burner fuel-air ratio, as well as a desired over-all boiler fuel-air ratio.

A further related object is to maintain a desired fuel-air ratio at an individual burner and also a desired fuel-air ratio at another individual burner, regardless of whether these desired ratios are the same or different.

The invention is carried out by monitoring the flame by spectroscopy. This is done by inspecting the flame and transmitting its radiation to a wavelength selecting means which transmits radiation at two selected wavelengths to a system which compares the radiation intensity at two selected wavelengths. Means is provided for creating a signal representing the ratio of these two radiation intensities. The ratio signal may be in the form of a voltage or current which can be used to control rate of admission of fuel or air, or both, to an individual burner. If the spectral radiation of the flame at the burner changes by reason of changes of fuel-air ratio, the ratio signal correspondingly changes. This signal may be used to produce an indication or record relating to the fuel-air ratio. Such a reading can be obtained in a matter of a second or so. The signal may also be used to cause operation of a mechanism controlling flow of the fuel or air, or both, to bring the fuel-air ratio to its desired pre-established value, or it may be applied as an input to a closed-loop control system. In this manner the fuel-air ratio can be maintained at a desired, or optimum value in spite of changes which could otherwise alter the ratio.

In one aspect of the invention the ratio signal is compared with a so-called "set point" signal, and a signal representing the difference (if any) between them is applied to operate the fuel control valve or the air control valve, for the burner, for desired flow rate.

In another aspect there can be used a master controller in the form of a computer, of a type heretofore in use for controlling a number of functions of the furnace or boiler. The said ratio signal applied to the programmed computer results in an output signal which maintains the fuel valve or air valve at its proper programmed flow rate. When such a master controller is used for controlling the flow valves of a number, or all, of the burners, the computer acts as a "floating set point" and correlates the flows at all such burners automatically according to its programming.

Burner control according to this invention permits the attainment of much greater fuel efficiency and less pollution than has heretofore been attainable in boiler operation.

The foregoing and other features of the invention will be better understood from the following detailed description and the accompanying drawings of which.

In the following description similar parts are represented by similar numerals.

Figure 1:
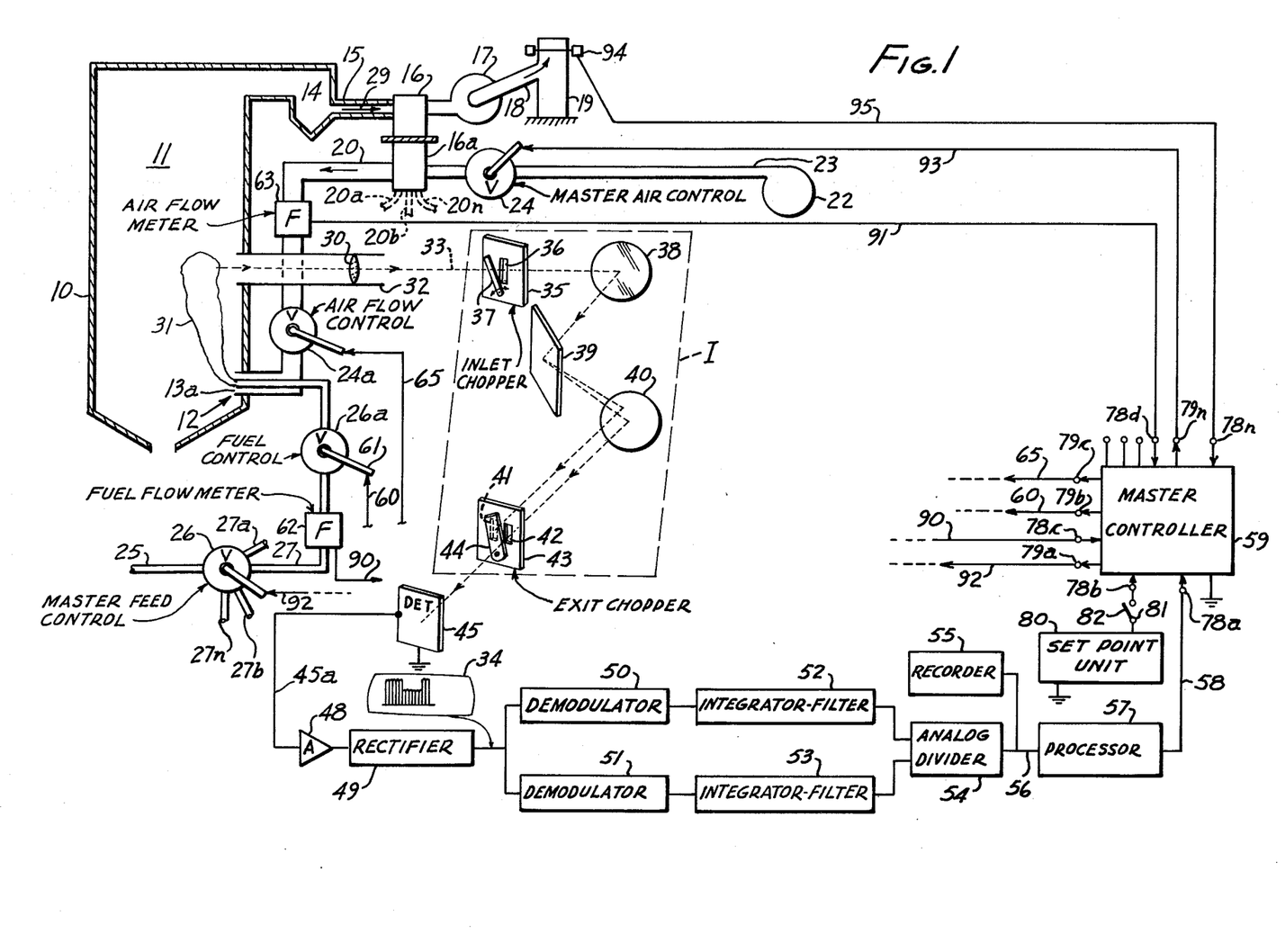
FIG. 1 is an elevation view, partially in cross-section of a furnace and stack arrangement according to this invention, including optical components and electric circuitry showing the attachment of means for monitoring the flame of a burner and controlling the flow of fuel or air or both to the burner.

Referring to FIG. 1 there is shown a furnace 10 of a type commonly used to heat a boiler (not shown). The furnace comprises a fire compartment 11 which ordinarily contains a number of burners of which there is shown one burner 12. An opening 13 at the bottom provides access to the atmosphere. At the exhaust end 14 of the furnace there is connected an exhaust conduit 15 leading to a heat exchanger 16 and then on to a motordriven blower 17, the outlet of which is connected by a conduit 18 to a stack 19. Air is forced into the furnace through opening 13a in the direction of arrow 21 by means of a blower 22. A conduit 23 from blower 22 contains a master air-control device or valve 24 for controlling total air flow rate to the furnace, including all burners, and leads into a portion 16a of heat exchanger 16 so as that the air from the blower is heated after passing through the master air control. From the heat exchanger 16 air can be sent through individual conduits to the individual burners of the furnace. A conduit 20 is the individual conduit for burner 12. Other individual air conduits are indicated as 20a, 20b---20n, equal to the number of burners of the furnace. Since no other burners than 12 are shown, these conduits are not completed. There are included in conduit 20 a burner air-flow meter 63 and a burner air-flow control 24a, both of which are well-known devices. The meter 63 measures the rate of flow of the air, and the air flow control is a valve which controls the rate of flow of the air. After passing through air-flow meter 63 and air-flow control 24a, the air in the conduit 20 enters the furnace through an opening 13a located at burner 12. Fuel such as gas, oil, pulverized coal, garbage, wood fibers or the like is supplied through a fuel conduit 25 through a suitable master fuel flow control device or valve 26 for controlling the total fuel flow rate to the entire set of burners in the furnace. From the output of value 26 fuel is distributed to the individual burners of the furnace. For this purpose there are a number of fuel conduit outlets 27, 27a, 27b, . . . 27n, equal to the number of burners of the furnace, from the output of valve 26. Conduit 27 is the particular conduit outlet which supplies burner 12 shown in FIG. 1. Since no other burner is shown in this figure, the other conduit outlets 27a, 27b, . . . 27n are not completed in the figure. Conduit 27 passes through opening 13a to connect with the burner 12. An individual fuel flow meter 62, measuring flow rate of fuel, and an individual fuel flow control device or valve 26a for controlling flow rate of fuel, are included in conduit 27. The individual burner flow control valve 26a controls only the fuel flow to burner 12. Burner 12 is supplied with air individually by conduit 20 from master air control 24. The other burners (not shown) of the furnace will be similarly supplied with air from the master air control by the other respective individual conduits.

In operation, the several burners of the furnace, ordinarily arranged in a row or rows, including burner 12, will be ingnited in a well-known manner. Referring to burner 12, air will enter the furnace through opening 13a as indicated by arrow 28, and in so doing will pass around the exit end of fuel conduit 27 and burner 12. The air at 28 passes through an individual burner air control valve 24a, coming from the air conduit 20. The gases within the furnace will flow out to the stack as indicated by arrow 29.

The furnace as thus far described is of a well-known type and needs no further detailed discussion here.

Apparatus for monitoring and controlling the fuel-air mixture in the furnace is illustrated in FIG. 1. This comprises a window 30 through which is seen the flame 31 from the burner 12. At the outside of this window there is placed one end of a flame viewing duct 32 through which radiant energy from the flame is brought to a chopper 35, herein referred to as an inlet (or high speed) chopper. The inlet chopper 35 is provided with an aperture 36 and a modulator in the form of a pivoted vane or rotary slotted wheel 37 adapted to reciprocate or rotate so as to alternately open and close aperture 36 to radiation path 33. The frequency of modulation of vane 37 is adjusted to some known frequency, for example 800 Hz. Thus chopper 35 chops radiation along path 33 at a rate dependent upon modulation of the modulator 37, thereby passing modulated radiation which modulates at a predetermined frequency, for example about 800 Hz.

The modulated radiation is reflected by a collimating mirror 38 toward a spectroscopic grating 39. Grating 39 disperses incident radiation so as to form a spectrum of radiation including emission lines representative of the various constituent emitting species in the flame 31. The radiation dispersed by grating 39 is focussed by a mirror 40 so that wavelengths of interest are directed through sets of apertures, such as 41 and 42, of a chopper 43, herein referred to as an exit chopper. This chopper contains a modulator 44 in the form of a pivoted vane or rotary slotted wheel which alternately blocks one aperture while unblocking the other. For example, a preselected emission wavelength can be directed through aperture 41, with the pre-selected continuum wavelength directed through aperture 42. Two or more wavelengths may be selected to provide the functional relationship to the air-fuel ratio. The number of apertures of chopper 43 will correspond with the number of selected wavelengths.

The operation of chopper 43 is such as to alternately pass images of two wavelengths of interest, such as images of continuum and images of emission, the rate of alternation of these two, such as between continuum and emission, being dependent upon the frequency of modulation of vane 44. The alternating radiation passed by chopper 43 impinges on a detector 45 which produces on a conductor 45a an output electrical signal which alternates between two levels at the frequency of modulation of chopper 43. The two levels associated with the output signal from detector 45 are representative of the intensities of the two wavelengths of interest. Chopper 43 should be adjusted to a frequency lower than that of chopper 35 and may for example be about 20Hz in a case where the frequency of choppper 35 is about 800Hz, so tht during one-half cycle of chopper 43 radiation at one wavelength of interest is passed through aperture 41, and during the other half cycle radiation at the other wavelength of interest is passed through aperture 42.

Figure 2:
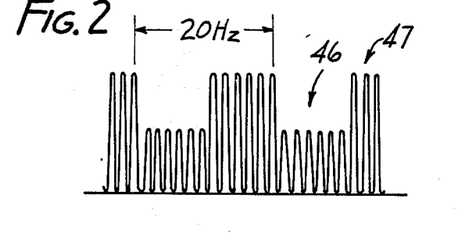
FIG. 2 illustrates an electric signal developed in the use of the system of FIG. 1.

FIG. 2 illustrates a waveform of an electric signal generated by detector 45 using the apparatus illustrated in FIG. 1. By way of example, detector 45 may be any suitable device whose electrical characteristics vary in accordance with the intensity of impinging radiation. The electric signal developed at cell 45 by virtue of the alternately impinging radiation for the two selected wavelengths appears as an alternating signal having a frequency of 800 Hz modulated by a 20 Hz signal in the case of this particular selection of modulation frequencies. Thus, for example, during one-half cycle as illustrated at 46, the amplitude of the electric signal is dependent upon the intensity of radiation in the continuum, and during the other half cycle as illustrated at 47, the amplitude of the electric signal is dependent upon the intensity of radiation at the emission wavelength.

There is provided an electrical system for analyzing the electric signal developed at the detector, which is illustrated in FIG. 1. The signal is amplified by an amplifier 48 and the amplified signal is rectified by rectifier 49, with a signal (such as 800 Hz) corresponding to the frequency of modulation by chopper 35. In practice, chopper 35 may be synchronously connected with the rectifier. Rectifier 49 operates by well-known principles, causing the amplitudes of the peaks at the rectifier output to vary between two distinct levels at the rate of the frequency of chopper 43, for example 20 Hz, as represented by the waveform within the enclosure 34.

The output of rectifier 49 is fed to demodulators 50 and 51 which are synchronously demodulated by chopper 43. Each demodulator demodulates separate half cycles of the 20 Hz signal. For example, demodulator 50 passes the rectified 800 Hz signal corresponding to the level of radiation of emission while demodulator 51 passes the rectified 800 Hz signal corresponding to the level of radiation of the continuum. In practice the source of demodulation (20 Hz) is chopper 43 so that chopper 43 and demodulators 50 and 51 operate in synchronism.

The resulting outputs from demodulators 50 and 51 are integrated and filtered by respective integrator-filters 52 and 53 to derive D.C. voltage levels having amplitudes dependent upon the intensities of radiation. Thus, the output from integrator-filter 52 is a D.C. signal having a voltage level dependent upon the intensity of one set of wavelengths of interest passed by chopper 43, whereas the output from integrator-filter 53 is a D.C. signal having a voltage level dependent upon the intensity of a second wavelength (or wavelengths) of interest, such as the continuum radiation passed by chopper 43. The two D.C. signals are fed to an analog divider 52 which is a well-known type of component functioning to determine the ratio between the two sets of wavelengths of interest. It provides a signal at line 56 (herein referred to as an "output signal") representative of the quality of the flame 31. Analog dividers suitable for this purpose are described in the text: "Electronic Analog and Hybrid Computers" by G. A. Korn and J. M. Korn, page 301, published by McGraw-Hill, New York 1964. A recorder 55 may be used for recording a permanent record of this output signal of the system, as shown in FIG. 1. The output signal at line 56 increases with increase of the air to fuel ratio. The determination of whether the flame is fuel rich or fuel lean results from a calibration of air to fuel ratio. There is a particular point on that curve at which the ratio is stoichiometric, and the signal intensity at that point indicates the stoichiometric condition. A lower signal intensity than that indicates fuel rich and a greater intensity indicates fuel lean.

The output signal at line 56 will be a current or voltage applied by line 56, through a processor 57 which outputs over a line 58 to a master control unit 59. The signal developed at line 58 is herein referred to as an "actuating signal". This master control unit outputs to the individual burner fuel control valve 26a for burner 12. More particularly this is accomplished by an output voltage or current at a line 60 from the master controller, dependent on voltage or current at line 58, (the actuating signal) which operates a suitable linkage at valve 26a represented diagrammatically by a member 61, to regulate the flow of fuel to the burner as a function of the intensity of the signal received by the master controller, from line 58. Assuming that the air flow into the furnace is maintained constant, it is apparent that the fuel-air ratio will be adjusted by this adjustment of the fuel valve 26a.

The master controller 59 is preferably in the form of a computer which may be of a well-known type. For example, a suitable computer for this purpose is that known as the Diogenes Process Controller available from Rosemount, Inc., Minneapolis, Minnesota, illustrated in Rosemount Bulletin No. 1016 published April 1974. Such a computer-controller is described in an article entitled "Upgrade Boiler Controls with DDC" by D. Perry in Power Magazine, pages 58-60, October 1975. The term DDC in the title signifies direct digital control. Such computers are commonly used for calculating and controlling various boiler parameters as described in Rosemount Bulletin 1016 dated Apr. 1974. The computer comprises a number of input terminals of which input terminals 78a, 78b, 78c, 78d and 78n are shown as being used, and a number of output terminals of which output terminals 79a, 79b, 79c and 79n are shown as being used. The processor 57 is an amplifier, preferably of a low noise type which functions as a scaler. Whereas the voltage range at conductor 56 from the demodulator-integrator electronics is generally in the range from zero to one volt, the computer functioning as the master controller 59 ordinarily requires input in the range 1 to 5 volts. The processor 57 serves to elevate the lower voltage range at conductor 56 to the desired high voltage range at conductor 58 while maintaining the proper scale.

Alternatively or in conjunction with controlling the fuel-air ratio by controlling the fuel valve, the fuel-air ratio may be controlled by control of the air flow into the furnace while maintaining the fuel flow constant. This can be done by controlling the air flow through the air flow meter 63 into the air control device or valve 24a so that the flow of air into the burner will be adjusted in accordance with the signal at line 56.

This can be done in a manner analogous to that used for controlling the fuel control to the burner. Thus a line 65 can be connected to an output terminal of the master controller 59 to operate a linkage 66 at the air-flow control 24a. This will regulate the flow of air to the burner as a function of the intensity of the actuating signal received by the master controller from line 58. Assuming that the fuel flow into the furnace is maintained constant it is apparent that the fuel-air ratio will be adjusted by this adjustment of the air valve 24a.

It will be recognized that it is also possible to adjust the fuel-air ratio by both the operation of the fuel control 26a over line 60 and the air-control 24a over line 65. In fact however, control of the fuel flow will usually be preferable over control of the air flow, as fuel flow control is ordinarily the more economical.

Figure 7:
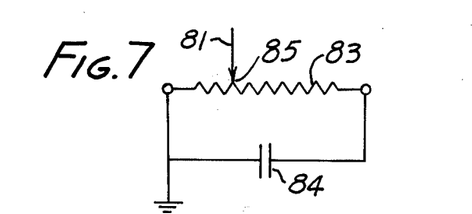
FIG. 7 shows a set-point unit in schematic form, used in FIG. 1.

A particular manner by which the fuel control valve 26a or the air control valve 24a may be controlled is as follows. Assuming that it is desired to control the fuel-air ratio at an individual burner such as burner 12, this may be done by use of a "set-point" unit 80, shown connectable over a line 81 through a switch 82 to an input terminal 78b of the master controller. Such a unit 80 is a well-known and readily available component. A simple example of a set point unit is illustrated schematically in FIG. 7 as comprising a potentiometer resistance 83 through which a current flows from a source of voltage shown as a battery 84. An adjustable potentiometer contact 85 connected to conductor 81 makes contact with the resistance 83. Thus by adjustment of the potentiometer contact 85 it is possible to apply any desired voltage at line 81 on the input terminal 78b of the master controller from zero to the full voltage of the voltage source 84. The voltage at line 81 is herein referred to as a "set point signal".

Assuming now that it is desired to control the fuel-air ratio at burner 12 by the fuel control valve alone, the air control valve 24a will be set for a desired air flow to this burner and the fuel control valve 26a will be set for a desired fuel flow. The desired fuel-air ratio is thus established, which will produce the desired flame quality at the burner. The valve 26a will be subject to a signal at line 60, while the air control valve 24a will not be made subject to any signal at line 65, which accordingly may be removed. (In fact there is no need for any air control valve for this particular purpose.) Furthermore none of the terminals 78c through 78n and terminals 79a, 79c and 79n, shown in FIG. 1, need be connected for this purpose. The structure of fuel control valve 26a is such that the desired fuel flow rate through it is maintained by the presence of line 60, which should have a given signal from a calibration curve when the valve 26a is set. Alternatively one can use the actual fuel flow as measured at meter 62 (which will involve use of terminal 78c and line 90). Switch 82 will be closed and the set point unit 80 will be set at some set voltage at conductor 81, for example one-half volt above ground. The electronics of the system between detector 45 and line 58 is established so that the signal at line 58 will produce within the master controller 59, when the adjustment of valve 26a is thus established, a signal equal to that for which the set point unit is set, which in this example is assumed to be one-half volt. The electronics or logic of the master controller is such that it compares the voltage of the set point signal at conductor 81 with that of the actuating signal at line 58 and applies a voltage (herein referred to as a "control voltage") on line 60 which represents the difference between the set point signal voltage and the actuating signal voltage at line 58. This difference voltage should be zero to maintain the desired fuel-air ratio. The fuel flow rate measured at meter 62 is translated to a signal on a line 90 which sends this last mentioned signal back to the master controller 59. With this signal information, the master controller automatically adjusts the fuel valve 26a. If during operation of the burner the fuel-air ratio should tend to change due for example to factors such as change of soot accumulation, the flame quality will likewise change, which will have the effect of producing a difference signal at line 60, which will be either positive or negative.

Figure 8:
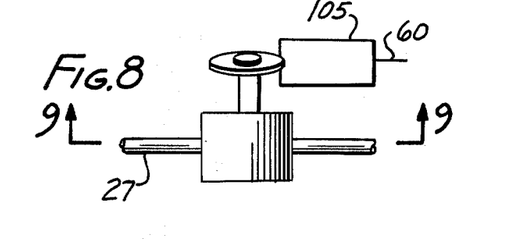
FIG. 8 is a schematic view of a flow-control valve used in FIG. 1.
Figure 9:
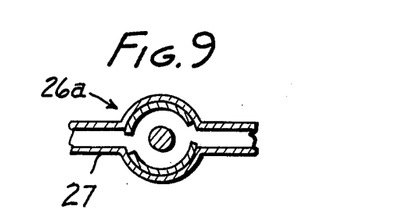
FIG. 9 is a cross-section view taken at line 9—9 of FIG. 8.

The member 61 of the fuel control valve is arranged so that it opens the valve further at one polarity and closes the valve further at the other polarity, of the signal at line 60. Thus assuming that a too lean fuel-air mixture results in a positive signal at line 60, its effect will be to open the valve enough to bring the line 60 signal back to zero when the correct fuel-air ratio has returned. In the case of a too rich fuel-air ratio a negative signal will appear at line 60 to close down the valve enough to bring the line 60 signal back to zero. Control valves for use as valve 26a operable by negative-zero-positive signals are well-known. Such a valve is shown in FIGS. 8 and 9 in a simplified schematic illustration. The valve 26a is shown as a rotary type valve which can be operated by a pneumatic to electronic conversion unit 105, which is a well-known type of unit operable by negative and positive signals.

Figure 10:
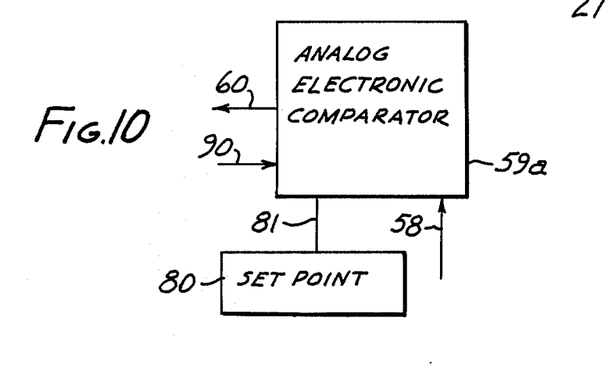
FIG. 10 shows a simplified arrangement for obtaining a valve-control signal which may be used in lieu of the master control arrangement shown in FIG. 1.

The use of a computer type master controller can be dispensed with when only an individual control valve for an individual burner is to be controlled from an actuating signal at line 58. In such case there can be substituted for the computer type master controller 59 a simple circuit to read the difference between the signals at lines 58 and 81. Such a difference-reading circuit is shown in FIG. 10 wherein the line 58 from the processor and the line 81 from the set point unit 80 are brought to an analog electronic comparator 59a, which is a well-known type of circuit. The line 60 from this comparator carries this difference signal to the fuel valve. Line 90 is connected from the flow meter 62, previously described, and is brought back to the comparator 59a to establish the particular signal voltage needed to be sent over line 60 to the control valve for the proper valve actuation for the proper flow rate.

If it be desired to control the fuel-air ratio at burner 12 by the air control valve alone, the fuel control valve 26a will be set for a desired fuel flow rate and the air control valve can be controlled over line 65 in dependence on a signal at line 58 and a set point unit 80 in conjunction with a difference-reading circuit in the same manner as described above for control of the fuel control valve.

If it be desired to control both the fuel control valve and the air control valve for burner 12, this can be done by use of the system from the detector 45 including elements 45a, 48, 49, 50, 51, 52, 53, 54, 55, 56, 57 and 58 and two set point units 80. The line 58 from the system comprising and the lines 82 from the two set point units will go to a compound difference-reading circuit, from which line 60 will go to the fuel control valve and line 65 will go to the air control valve.

Although a simple difference-reading circuit such as shown in FIG. 10 is sufficient for controlling an individual burner it will usually be desired to use the computer type master controller illustrated in FIG. 1. In the first place many, if not most, large boiler installations already contain such a computer for controlling certain functions, some of which are shown in FIG. 1 and will be described hereinafter. Furthermore the computer provides a means for refinement of burner fuel ratio control as will appear presently.

Figure 11:
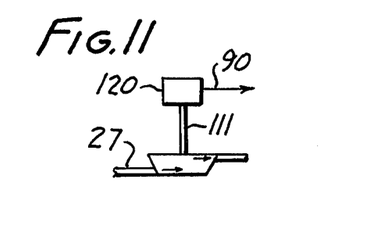
FIG. 11 shows a flowmeter adapted to produce a signal indicating flow rate, used in FIG. 1.

Referring again to fuel control valve 26a, it is seen that whatever fuel flow rate occurs at this valve is measured at the burner fuel flow meter 62. Such a fuel flow meter is illustrated schematically in FIG. 11. It has a turbine 110 in the flow conduit, mounted on a shaft 111 which turns a generator 120 to generate a signal voltage dependent on its speed of rotation, and hence of the flow rate, and sends the signal over line 90 to an input of the master controller 59.

When the desired fuel-flow rate is occurring through fuel-control valve 26a and hence through fuel-flow meter 62, the signal at line 90 is zero by reason of the adjustment provided at fuel-flow meter 62, hence line 90 produces no effect at the master controller 59. Under this condition there is no condition at line 60 to produce any change at the fuel-control valve 26a. However, if the flow rate at meter 62 becomes higher or lower than desired there is produced at line 90 a positive or negative signal depending on whether the flow rate is too high or too low, which is applied at master controller 59. The operation of the computer-type master control is to send a corresponding signal over line 60 to affect fuel control valve 26a in the direction required to bring the flow rate back to its normal desired value. The computer can be readily programmed in a well-known manner, to establish the particular flow rate which is desired. The action of signals at lines 60 and 90 automatically maintains the desired flow rate.

If it be desired to control the air-flow control valve 24a instead of the fuel-control valve 26a, this same type of automatic control through the master controller 59 can be performed. Thus, the air-flow meter 63 can be structured in a manner analogous to the structure described for the fuel-flow meter 62, and a line 91 from the air-flow meter 63 can be brought back to the master controller 59 to operate in conjunction with line 65 to maintain the flow through the air-control valve 24a at the desired level.

What has been illustrated and described with reference to FIG. 1 pertains to a single burner. But since a boiler ordinarily contains a number of burners, it will ordinarily be desired to apply a similar system to each individual burner. Thus the individual fuel conduits 27a, 27b, ... 27n and air conduits 20a, 20b, ... 20n will be brought to their respective individual burners in the same manner that conduits 27 and 20 are shown brought to burner 12. The individual conduit systems for the respective individual burners will have flow meters and flow-control valves connected in the manner similar to the arrangement shown for burner 12. Each individual burner will be provided with its window at the flame and its optical and detector and electrical components to an outlet line corresponding to line 58 of FIG. 1 to an inlet of the master controller 59. For each individual burner there will also be lines 60, 65, 90 and 91 connected with the master controller 59. There need be only one master controller 59 for the entire furnace, and the computer of this master controller may be programmed to control the individual burners in the manner described in connection with burner 12.

When using the master controller 59 to control a number, or all, of the burners of a boiler as described herein, the master controller acts as a "floating set-point" as the proper signal at the several output lines such as 60 or the several output lines such as 65 is governed by the action of this computer, and since all the burners are sharing in the total fuel and air there is an interrelationship whereby the control signal of each such output line is dependent on the others.

One of the functions of this type of master controller heretofore in use has been to control the total fuel-flow rate at the master fuel control valve 26 over a line 92, and to control the total air flow through the furnace by controlling the master air control valve 24 over a line 23. This has provided a means for making the over-all total fuel-air ratio through all the burners of the entire furnace at the stoichiometric value, or any other desired value and the computer of the master controller has been programmed to do this. But since such control has not controlled the fuel-air ratio at the individual burners, it is the fact that individual burners have not heretofore operated at the stoichiometric fuel-air ratio or any other desired fuel-air ratio. In consequence, many burners have heretofore operated at too lean or too rich a mixture for the most efficient operation from the standpoint of fuel consumption.

It has also heretofore been known to incorporate a stack analyzer 94 to analyze emissions going up the stack from the furnace, and to obtain from it a signal over a line 95 which is sent back to the master controller to control total fuel flow through valve 26, or total air flow through valve 24 in accordance with the analysis of gas emissions at the stack.

It has also heretofore been a practice to control fuel flow in accordance with load demand through a master controller such as 59.

With the total air flow and the total fuel flow established according to this prior known art for the desired overall fuel-air ratio by means of the master controller, it is possible in accordance with this invention to distribute the fuel and the air to the individual burners so that the individual burners will be maintained at a desired fuel-air ratio. The desired fuel-air ratio or ratios for the several individual burners may thus be established by programming the computer to the stoichiometric or off stoichiometric value, or some burners may deliberately be made to have a different fuel-air ratio from others. Furthermore, it is possible for some burners to be given a different fuel-flow rate and air-flow rate than other burners while maintaining them either stoichiometric or off-stoichiometric. For example, where burners are arranged in a horizontal row as is common, it is often desirable at high loads to provide for smaller flames at the corners of the furnace to avoid over heating boiling tubes in these areas. This is referred to as "flame shaping."

It is common to arrange two or more horizontal rows of burners one above another. In such cases it is sometimes desirable to provide that the lower row of burners receive an excess of fuel above the stoichiometric fuel-air ratio and to provide for the uppermost row of burners to receive less fuel than the stoichiometric ratio, so that there can be an excess of air above all the burners. This is sometimes done where it is desired to reduce nitrogen oxide emissions.

Under a condition of decreasing load the temperature of the combustion products of the furnace decreases. Where a furnace is provided with super-heaters or re-heaters, or both, above the flames of the burners, it often is desired that fairly high temperatures be maintained in the regions of such superheaters or reheaters, as they operate most efficiently at certain operating temperatures. Under this condition it may be desirable to provide greater flames at the top row of burners than at the rows of burners beneath the top row. This may be done by programming the computer 59 to do this.

The air and fuel control mechanism may be any desired well-known type capable of being controlled from line 56 or 58.

The positions of the slits such as 41 and 42, relative to the grating 39 and the spacing apart of these slits will ordinarily be selected in accordance with the radiation emission characteristics which exist in the flame at the burner. It is known that with changes of fuel-air ratio at the burner there are corresponding changes of colors, or relative intensities of colors, of the flame.

Figure 3:
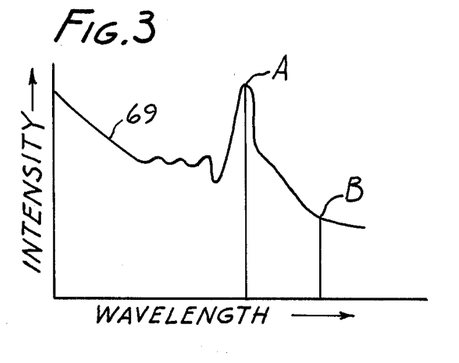
FIG. 3 shows a sample of radiation spectra.

FIG. 3 illustrates a general form of radiation characteristic such as may be seen at the input chopper. At a particular wavelength indicated as A in FIG. 3 there is an emission peak at which the radiation intensity rises sharply, after which the intensity reduces again to the general line of decreasing continuum radiation at a higher wavelengh B. One of the exit slits, for example, slit 41, may be placed at a position relative to the grating 36 so that this slit passes the emission radiation at wavelength A. The other slit may be placed at a nearby position where there is continuum radiation, selected as the position of wavelength B. The expression "quantitative transition", which is well understood in the art of spectroscopy, is used herein to signify a transition either electronic or molecular of the energy level which is specific to a chemical under observation and which results in emission or absorption of radiation at precise wave lengths. The radiation characteristic of FIG. 3 is given merely as a sample and is not necessarily one which will be found in any particular furnace or situation.

Figure 4:
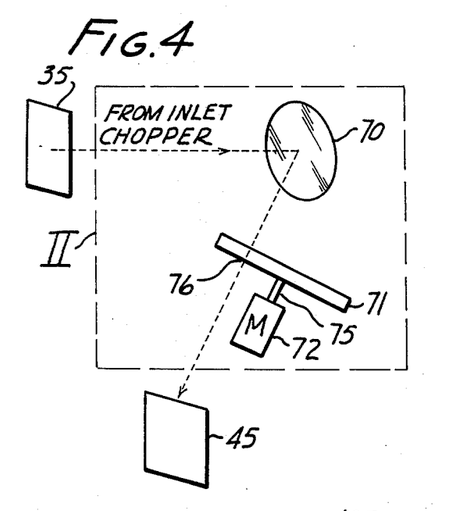
FIG. 4 shows a modified arrangement of components which may be used in the system of FIG. 1.
Figure 5:
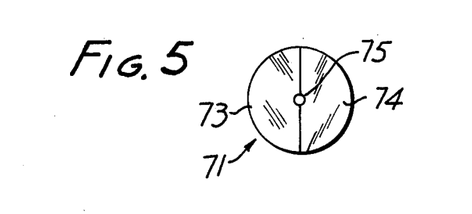
FIG. 5 shows a face view of an optical filter disc in the arrangement of FIG. 4.

FIGS. 4 and 5 illustrate and alternate arrangement for the selection of the two sets of wavelength(s) of interest. Thus, the components within the broken line enclosure designated II in FIG. 4 may be substituted for the components within the broken line enclosure designated I in FIG. 1. The components shown in FIG. 4 comprise a focussing mirror 70, and a disc 71 rotatable by a motor 72. The disc 71, a face view of which is illustrated in FIG. 5, comprises two optical filter elements 73 and 74, each occupying half the area of the face of the disc and joined along a diameter of the disc. The motor drive shaft 75 is attached at the center of the disc. The disc and the mirror 70 are positioned relative to each other so that the radiation beam from the inlet chopper is directed through the filter disc 71 at a point 76 which is off center relative to shaft 75 and is focussed at the position 76. The radiation passing through the filter disc is directed to the detector 45 as described in connection with FIG. 1.

It is seen that when the motor is rotated, the filter elements 73 and 74 are alternately placed in the paths of the radiation reflected from mirror 70 at a frequency depending on the speed of the motor. The motor speed may be such that the frequency will be the same as that of the reciprocation of the vane 44 in FIG. 1, which is described for example as 20 Hz. Thus the resulting wave form will be like that of FIG. 2. It will be recognized that the signals received at the detector will be processed through the electronic circuitry to the recorder to the processor, to the master controller, to the air control or the fuel control in the manner described in connection with FIG. 1.

A measurement of multiple sets of wavelength intensities may be of interest. In this case, more than one wavelength selection module might be used in the same unit. An example of one such combination is shown in FIG. 6.

Figure 6:
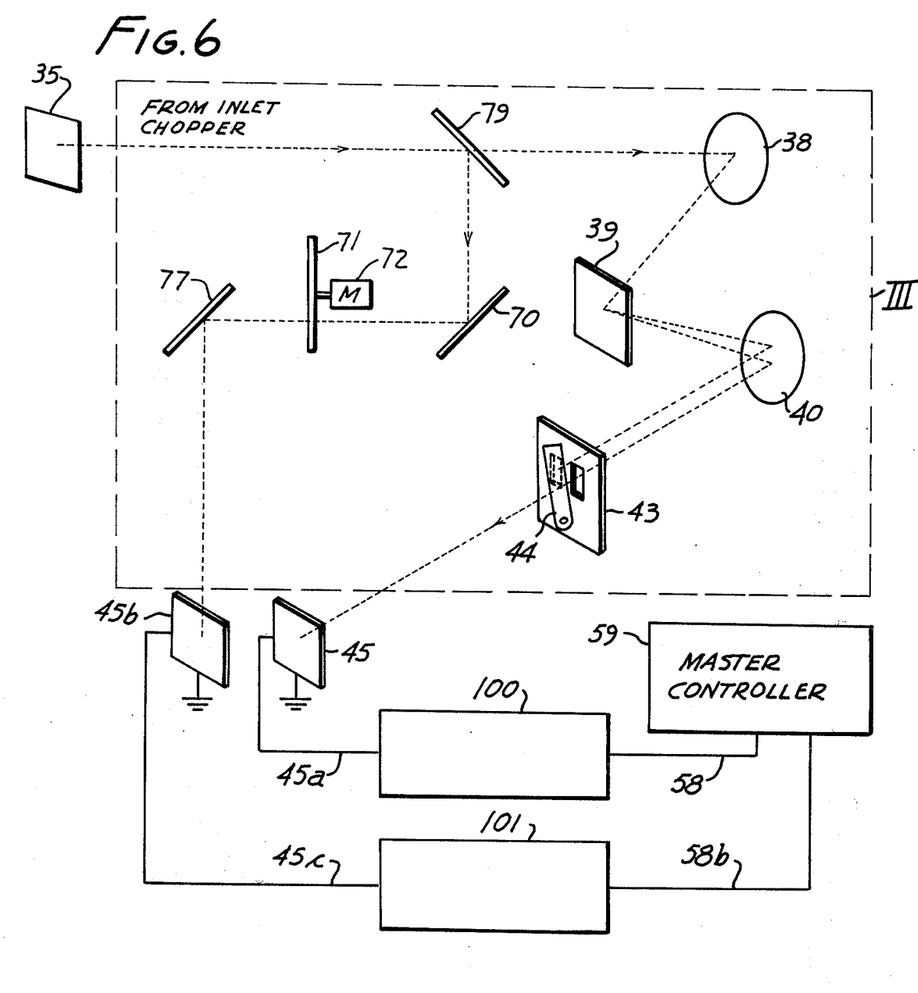
FIG. 6 shows a further modification of the arrangement of components which may be used in the system of FIG. 1.

FIG. 6 illustrates components within a broken line enclosure III which may be substituted for the components within the broken line enclosure I of FIG. 1. The components within enclosure III comprise a combination of those within enclosures I and II, of FIGS. 1 and 4, respectively, and similar numerals represent similar components. In FIG. 6 the radiation from the inlet chopper 35 impinges on a beam splitter 79 which has the property of transmitting through it part of the radiant energy impinged upon it and sending it to mirror 38, and of reflecting part of the impinging radiant energy to mirror 70. The radiation reflected from mirror 70 passes through filter disc 71 as described in connection with FIG. 4 and after passing through the filter elements it is reflected by mirror 77 to the detector 45b. The radiant energy impinged on mirror 38 is reflected to the grating 39 as described in connection with FIG. 1 from where it is reflected by mirror 40 and its two beams representing the two wavelengths to be selected by the slits 41 and 42 of the chopper 43 are then passed to the detector 45 in the manner described in connection with FIG. 1.

Since there are two detectors 45 and 45b, there will be two electrical systems represented by rectangles, 100 receiving the output from detector 45 over line 45a and 101 which receives the output from detector 45b over line 45c. Each of the rectangles 100 and 101 represents the components shown in FIG. 1 by numerals 48, 49, 50, 51, 52, 53, 54, 55, 56, and 57. The output from equipment 101 is passed over line 58 to the master controller 59 and the output from equipment 101 is passed to the master controller over line 58b. Other lines to and from the master controller can be similar to those shown in FIG. 1.

The modification of FIG. 6 may have advantages in instances where the arrangement of FIG. 1 or the modification of FIG. 4 could be useful, and especially in instances where signal intensity may be weak with either the arrangement of FIG. 1 or FIG. 5, alone.

It is seen that by this invention it is possible to measure or get a reading substantially instantaneously of the flame quality at any individual burner and also to control the flame quality at each and any individual burner as desired. By reason of this it is possible to obtain much greater efficiency of operation of a boiler, with corresponding saving of fuel than has heretofore been possible.

We claim:

1. In combination with a furnace of the type having a burner where fuel is burned in the presence of air to create a flame, means for delivering fuel to the burner, and means for delivering air to the burner;
    means for viewing the flame and receiving radiation from it over a range of wave lengths radiated from the flame;
    means for selecting radiations from the viewing means at the wave length regions of two wave length sets within the range;
    means for detecting the intensity of radiations at the selected wave length regions;
    means responsive to the detecting means for producing an output signal having a magnitude dependent upon the relationship of the radiation intensities at the selected wave length regions;
    whereby the magnitude of said output signal provides an indication related to the quality of the flame and the fuel-air ratio at the burner.

2. A combination according to claim 1 in which each of said sets comprises a single wave length.

3. A combination according to claim 1 which includes means responsive to said radiation intensity relationship to control the fuel-air mixture.

4. A combination according to claim 2 in which at least one of the two selected wave lengths is at an emission wave length region of a quantified transition.

5. A combination according to claim 2 in which each of the two selected wave lengths is at an emission wave length region of a quantified transition.

6. A combination according to claim 2 in which one of the selected wave lengths is at an emission wave length region and the other is at an adjacent continuum region.

7. A combination according to claim 1 in which the means for selecting radiations comprises an inlet slit provided with an inlet chopper which interrupts the radiation from the flame viewing means at an established frequency, a wave length dispersing means which creates a wave length spectrum of the radiation from the inlet chopper including spectrum lines from the selected wave length regions; and a pair of outlet slits positioned to coincide with said spectrum lines.

8. A combination according to claim 7 in which an outlet chopper is related to the outlet slits for alternately blocking radiation passed to the detecting means from the outlet slits.

9. A combination according to claim 7 in which the wave length dispersing means comprises a wave length dispersive grating.

10. A combination according the claim 1 in which the wave length selection means comprises a pair of wave length selective filters which pass the respective selected wave length regions.

11. A combination according to claim 7 in which the wave length dispersing means comprises a wave length dispersive grating and also a pair of wave length selective filters which pass the respective wave length regions.

12. A combination according to claim 1 in which the means for delivering fuel to the burner comprises a conduit, and a fuel flow control valve is included in said conduit, said combination including means responsive to said output signal to control said valve for control of the fuel flow rate to the burner.

13. A combination according to claim 1 in which the means for delivering air to the burner comprises an air conduit, and said combination includes an air control valve in said air conduit and also includes means responsive to said output signal to control said air flow valve for control of the air to said burner.

14. A combination according to claim 3 which includes: means developing an actuating signal dependent on said output signal; means developing a set point signal; means comparing the actuating signal with said set point signal; means developing a control signal which is the difference between said set point signal and the actuating signal; and means responsive to said control signal to control the fuel flow to the burner.

15. A combination according to claim 3 which includes: means developing an actuating signal dependent on said output signal; means developing a set point signal; means comparing said actuating signal with said set point signal; means developing a control signal which is the difference between said set point signal and the actuating signal; and means responsive to said control signal to control the air flow to the burner.

16. A combination according to claim 3 including a master controller which receives a signal dependent on said output signal to develop a control signal which controls the fuel-air ratio of said burner.

17. In combination with a furnace of the type having a plurality of burners at each of which fuel is burned in the presence of air to create a flame, means for delivering fuel to each of said burners, and means for delivering air to each of said burners:
    means at each burner for viewing the flame therefrom and receiving radiation from the flame over a range of wavelengths radiated from the flame;
    a spectral analyzer for analyzing the radiation from each individual flame;
    means for detecting the intensity of radiations from each analyzer;
    means responsive to the detecting means of each analyzer for producing an output signal having a magnitude dependent upon the relationship of the radiation intensities at selected wavelength regions of the respective flame;
    a master controller which receives a signal dependent upon the output signal from the radiation intensity relationship at each flame; and
    means producing control signals from the master controller which control the fuel/air relationship at the respective burners.

18. A combination according to claim 17 in which the means producing control signals from the master controller produces the stoichiometric fuel/air relationship at at least part of the total number of burners.

19. A combination according to claim 17 in which the means producing control signals from the master controller produces an off-stoichiometric fuel/air relationship at at least part of the burners.

20. A combination according to claim 17 in which the means producing control signals from the master controller produces a flame intensity at part of the burners which is different from the flame intensity produced at another part of the burners.

21. A combination according to claim 17 in which the master controller is programmed to adjust fuel flow and air flow to the burners in correspondence with load demand on the furnace.

22. A combination according to claim 17 in which the plurality of burners is arranged in a plurality of horizontal rows of burners spaced vertically from each other and the means producing control signals from the master controller provides a fuel/air relationship at the upper row of burners which is leaner than the fuel/air relationship at a lower row of burners.

23. A combination according to claim 17 in which the furnace has a conduit through which combustion products from the burners are expelled from the furnace and a gas emissions monitor is installed at said conduit to create a signal indicative of the quality of gas emission through the conduit and said means producing control signals from the master controller includes means to control the fuel/air ratio at the burners in accordance with said gas emission signal.

24. The method of obtaining an indication of the ratio of fuel and air supplied to a burner to maintain a flame, which comprises separating the radiation emission from the flame into spectral wave length components and measuring the intensity of at least two of the components the ratio of which is related to the ratio of fuel and air.

25. Method according to claim 24 which includes developing an output signal representing the ratio of the intensities of the two components.

26. Method according to claim 25 which includes developing from said output signal a control signal which controls the fuel/air ratio at the burner.

27. Method of controlling the ratio of fuel and air supplied to each of a plurality of burners in a furnace, which comprises performing the method according to claim 26 on each of said burners, developing a signal responsive to the fuel flow rate at each burner and computing from said responsive signals the magnitude of the control signal developed for each burner.

28. A combination according to claim 1 in which the means for selecting radiations from the viewing means comprises: an inlet chopper; means for dispersing the radiations into separated wavelength components and an exit chopper for selecting two of the wavelength components.

29. A combination according to claim 28 in which the dispersing means comprises a grating.

30. A combination according to claim 28 in which the dispersing means comprises an optical filter which selects two of the wavelength components.

31. A combination according to claim 1 in which the means for selecting radiations from the viewing means comprises: in inlet chopper, a beam splitter for splitting the radiation passed by the inlet chopper into two paths; a grating in one of the paths for dispersing the radiations into separated wavelength components; an exit chopper in the last-mentioned path for selecting two of the wavelength components; and an optical filter in the other of said paths for selecting two of the wavelength components; each path terminating at a separate detector.

* * * * *